United States Patent
Yamashita

(10) Patent No.: US 11,387,851 B2
(45) Date of Patent: Jul. 12, 2022

(54) RADIO FREQUENCY MODULE AND COMMUNICATION DEVICE

(71) Applicant: Murata Manufacturing Co., Ltd., Nagaokakyo (JP)

(72) Inventor: Takahiro Yamashita, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/184,614

(22) Filed: Feb. 25, 2021

(65) Prior Publication Data
US 2021/0288677 A1    Sep. 16, 2021

(30) Foreign Application Priority Data

Mar. 13, 2020    (JP) .............................. JP2020-043940

(51) Int. Cl.
*H04B 1/00*    (2006.01)
(52) U.S. Cl.
CPC ........... *H04B 1/0078* (2013.01); *H04B 1/006* (2013.01)
(58) Field of Classification Search
CPC ........ H04B 1/0078; H04B 1/006; H04B 1/52; H04B 1/0057
See application file for complete search history.

(56) References Cited

U.S. PATENT DOCUMENTS

| | | | | |
|---|---|---|---|---|
| 6,766,149 B1 * | 7/2004 | Hikita | .................... | H03H 9/725 343/702 |
| 7,242,268 B2 * | 7/2007 | Hagiwara | ................ | H03H 7/42 333/133 |
| 8,660,603 B2 * | 2/2014 | Block | .................... | H04B 1/006 455/88 |
| 8,803,632 B2 * | 8/2014 | Takeuchi | ................ | H03H 7/38 333/101 |
| 9,071,225 B2 * | 6/2015 | Nishihara | .............. | H03H 9/173 |
| 9,118,302 B2 * | 8/2015 | Shimizu | ................... | H03H 9/70 |

(Continued)

FOREIGN PATENT DOCUMENTS

| JP | 2016-96486 A | 5/2016 |
|---|---|---|
| JP | 2017-168932 A | 9/2017 |

(Continued)

OTHER PUBLICATIONS

Office Action dated Feb. 8, 2022, in corresponding Korean patent Application No. 10-2021-0020899, 9 pages.

*Primary Examiner* — Jinsong Hu
*Assistant Examiner* — Rui M Hu
(74) *Attorney, Agent, or Firm* — Xsensus LLP

(57) ABSTRACT

A module board including a first principal surface and a second principal surface on opposite sides of the module board, the first principal surface and the second principal surface each having at least one circuit component mounted thereon; a plurality of external-connection terminals; a first switching integrated circuit (IC) connected to an antenna connection terminal that is one of the plurality of external-connection terminals; and a second switching IC connected to the antenna connection terminal, the second switching IC being different from the first switching IC. In the above-described module board, the plurality of external-connection terminals are disposed on the second principal surface, and at least one of the first switching IC or the second switching IC is disposed on the second principal surface.

4 Claims, 10 Drawing Sheets

(56) References Cited

U.S. PATENT DOCUMENTS

| | | | | |
|---|---|---|---|---|
| 9,219,467 B2* | 12/2015 | Inoue | | H03H 9/706 |
| 9,252,832 B2* | 2/2016 | Matsuo | | H04B 1/50 |
| 9,660,687 B2* | 5/2017 | Ella | | H04B 1/40 |
| 9,866,366 B2* | 1/2018 | Pehlke | | H04L 5/14 |
| 9,929,769 B1* | 3/2018 | Guyette | | H04W 72/0453 |
| 10,075,199 B2* | 9/2018 | King | | H04L 5/001 |
| 10,237,050 B2* | 3/2019 | Khlat | | H04L 5/1461 |
| 10,367,474 B2* | 7/2019 | Park | | H03H 9/725 |
| 10,756,705 B2* | 8/2020 | Park | | H03H 9/725 |
| 11,165,406 B2* | 11/2021 | Lin | | H03H 9/02007 |
| 2002/0137471 A1* | 9/2002 | Satoh | | H04B 1/406 455/553.1 |
| 2003/0092397 A1* | 5/2003 | Uriu | | H03H 7/463 455/78 |
| 2004/0048634 A1* | 3/2004 | Satoh | | H04B 1/006 455/562.1 |
| 2004/0071111 A1* | 4/2004 | Satoh | | H04B 1/48 370/329 |
| 2004/0075491 A1* | 4/2004 | Kushitani | | H04B 1/44 330/51 |
| 2004/0203552 A1* | 10/2004 | Horiuchi | | H04B 1/005 455/333 |
| 2004/0217914 A1* | 11/2004 | Yamashita | | H04B 1/44 343/850 |
| 2004/0232982 A1* | 11/2004 | Ichitsubo | | H01L 24/49 330/129 |
| 2005/0003855 A1* | 1/2005 | Wada | | H04B 1/005 455/168.1 |
| 2005/0037800 A1* | 2/2005 | Shih | | H04B 1/006 455/552.1 |
| 2005/0104685 A1* | 5/2005 | Kuroki | | H01L 25/16 333/133 |
| 2005/0197095 A1* | 9/2005 | Nakamata | | H04B 1/006 455/403 |
| 2005/0221768 A1* | 10/2005 | Kemmochi | | H01P 1/2135 455/78 |
| 2006/0044080 A1* | 3/2006 | Hagiwara | | H03H 7/42 335/193 |
| 2006/0094393 A1* | 5/2006 | Okuyama | | H04B 1/44 455/333 |
| 2006/0117163 A1* | 6/2006 | Okuyama | | H05K 1/0218 712/1 |
| 2006/0284703 A1* | 12/2006 | Iwasaki | | H03H 9/0095 333/133 |
| 2007/0183348 A1* | 8/2007 | Totsuka | | H03H 9/725 370/276 |
| 2008/0166980 A1* | 7/2008 | Fukamachi | | H04B 1/0057 455/83 |
| 2009/0128254 A1* | 5/2009 | Goi | | H04B 1/0067 333/101 |
| 2010/0091752 A1* | 4/2010 | Kemmochi | | H03H 7/463 370/339 |
| 2010/0135193 A1* | 6/2010 | Przadka | | H04B 1/0057 370/297 |
| 2010/0157860 A1* | 6/2010 | Hagiwara | | H04B 1/48 370/310 |
| 2011/0110452 A1* | 5/2011 | Fukamachi | | H04B 1/0057 375/267 |
| 2011/0193614 A1* | 8/2011 | Murase | | H04B 1/006 327/419 |
| 2011/0279193 A1* | 11/2011 | Furutani | | H03H 9/0566 333/132 |
| 2012/0075002 A1* | 3/2012 | Uejima | | H04B 1/006 327/365 |
| 2012/0274416 A1* | 11/2012 | Hara | | H03H 9/725 333/195 |
| 2012/0293277 A1* | 11/2012 | Hara | | H03H 9/132 333/133 |
| 2013/0141180 A1* | 6/2013 | Uejima | | H04B 1/18 333/26 |
| 2013/0176915 A1* | 7/2013 | Uejima | | H04B 1/0057 370/278 |
| 2013/0272176 A1* | 10/2013 | Uejima | | H04B 1/006 370/282 |
| 2014/0002209 A1* | 1/2014 | Ono | | H05K 1/0243 333/101 |
| 2014/0307836 A1* | 10/2014 | Khlat | | H04B 1/04 375/343 |
| 2015/0061406 A1* | 3/2015 | Ono | | H05K 1/18 307/112 |
| 2015/0188582 A1* | 7/2015 | Kahrizi | | H04B 1/0067 455/77 |
| 2015/0304059 A1* | 10/2015 | Zuo | | H04B 1/0057 370/343 |
| 2016/0079934 A1* | 3/2016 | Ichitsubo | | H03F 3/19 330/251 |
| 2016/0099800 A1* | 4/2016 | Park | | H04B 1/44 370/275 |
| 2016/0301382 A1* | 10/2016 | Iwamoto | | H03H 9/725 |
| 2016/0315653 A1* | 10/2016 | Saji | | H04B 1/44 |
| 2017/0033773 A1* | 2/2017 | Reid | | H01P 1/202 |
| 2017/0093442 A1* | 3/2017 | Jayaraman | | H04W 52/52 |
| 2017/0141801 A1* | 5/2017 | Watanabe | | H03H 9/64 |
| 2017/0222666 A1* | 8/2017 | Hyun | | H04B 1/0057 |
| 2017/0264336 A1* | 9/2017 | Saji | | H04L 5/14 |
| 2017/0264337 A1* | 9/2017 | Kogure | | H03J 7/186 |
| 2017/0288707 A1* | 10/2017 | Yun | | H03H 3/00 |
| 2018/0226928 A1* | 8/2018 | Obiya | | H04B 1/00 |
| 2018/0227008 A1* | 8/2018 | Obiya | | H04B 1/0458 |
| 2019/0214355 A1 | 7/2019 | Nishikawa | | |
| 2019/0273480 A1* | 9/2019 | Lin | | H03H 9/564 |
| 2019/0273521 A1* | 9/2019 | Nishikawa | | H03H 9/6483 |
| 2019/0326879 A1* | 10/2019 | Nakamura | | H03H 9/02574 |
| 2019/0348968 A1* | 11/2019 | Park | | H04B 1/006 |
| 2020/0007096 A1 | 1/2020 | Kita | | |
| 2020/0014429 A1* | 1/2020 | Leung | | H04B 1/0057 |
| 2020/0168970 A1* | 5/2020 | Brunette | | H05K 9/0039 |
| 2020/0177212 A1* | 6/2020 | Cong | | H04B 1/401 |
| 2020/0274520 A1* | 8/2020 | Shin | | H03H 9/02015 |
| 2020/0358464 A1* | 11/2020 | Abbott | | H03H 9/25 |
| 2020/0412403 A1* | 12/2020 | Pehlke | | H04L 5/14 |
| 2021/0044278 A1* | 2/2021 | Kankar | | H03H 9/587 |

FOREIGN PATENT DOCUMENTS

| | | |
|---|---|---|
| KR | 2019-0040041 A | 4/2019 |
| WO | 2018/168500 A1 | 9/2018 |

* cited by examiner

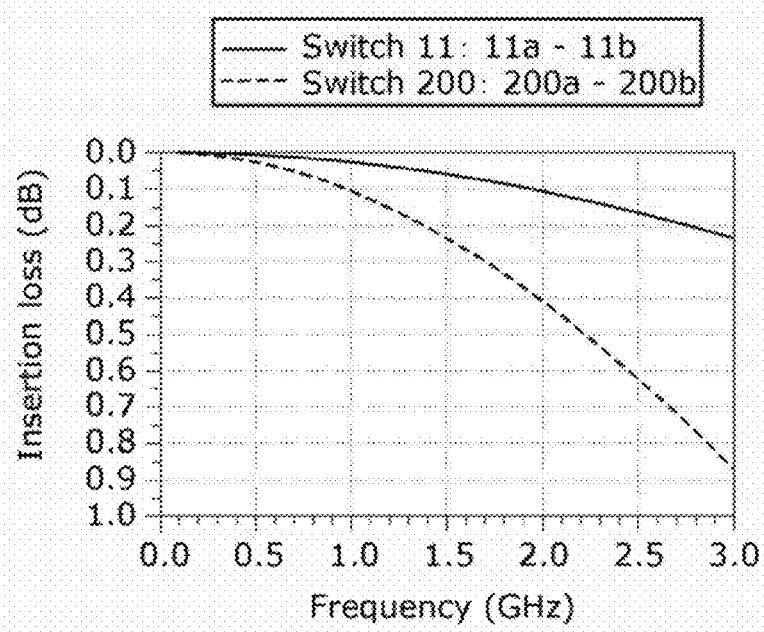

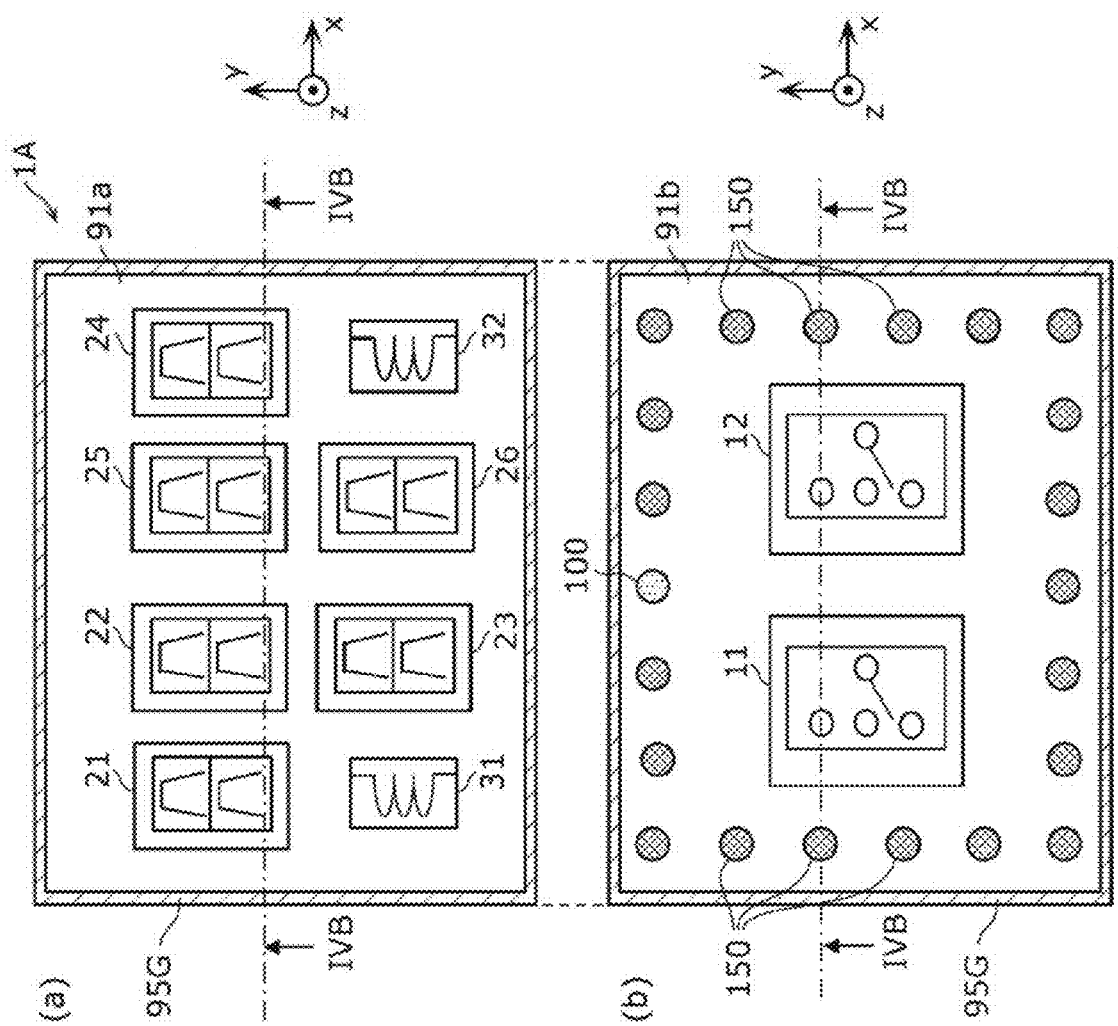

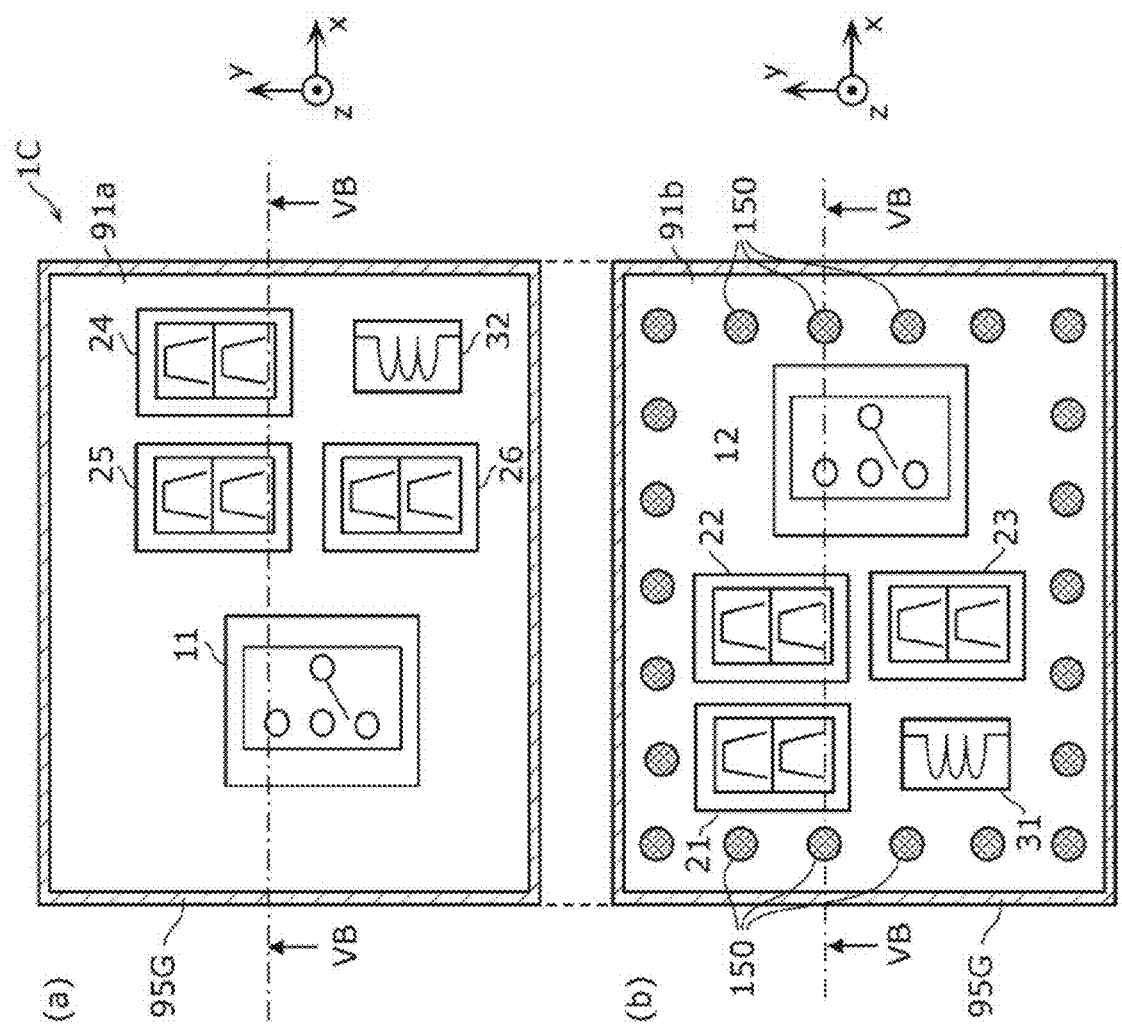

RADIO FREQUENCY MODULE AND COMMUNICATION DEVICE

CROSS-REFERENCE TO RELATED APPLICATION

The present application is based on and claims priority of Japanese Patent Application No. 2020-043940 filed on Mar. 13, 2020. The entire disclosure of the above-identified application, including the specification, drawings and claims is incorporated herein by reference in its entirety.

TECHNICAL FIELD

The present disclosure relates to a radio frequency (RF) module and a communication device.

BACKGROUND

Japanese Unexamined Patent Application Publication No. 2016-96486 discloses a circuit configuration of a radio frequency module in which a transmission and reception circuit of a high-band side and a transmission and reception circuit of a low-band side are connected to an antenna. The transmission and reception circuit of the high-band side includes a plurality of duplexers that have different communication bands as passbands, and a first switching circuit to which the plurality of duplexers are connected. The transmission and reception circuit of the low-band side includes a plurality of duplexers that have different communication bands as passbands, and a second switching circuit to which the plurality of duplexers are connected. With this configuration, it is possible to ensure isolation between the transmission and reception circuit of the high-band side and the transmission and reception circuit of the low-band side.

SUMMARY

Technical Problems

However, as recognized by the present inventor, according to Japanese Unexamined Patent Application Publication No. 2016-96486, arranging, in a single radio frequency module, the transmission and reception circuit of the high-band side and the transmission and reception circuit of the low-band side which are separately provided leads to an increase in size of the radio frequency module. In particular, with developments in multiband technologies, the circuit size becomes larger and an increase in size is accelerated as the number of communication bands used increases, and the lengths of the lines connecting the antenna to the above-described two transmission and reception circuits increase, leading to an increase in transfer loss.

The present disclosure addresses the above-described problems, and is presented to provide a radio frequency module and a communication device with reduced sizes and reduced transfer loss.

Solution

In order to provide such a radio frequency module and such a communication device as described above, a radio frequency module according to one aspect of the present disclosure includes a module board including a first principal surface and a second principal surface on opposite sides of the module board, the first principal surface and the second principal surface each having at least one circuit component mounted thereon; a plurality of external-connection terminals; a first switching integrated circuit (IC) connected to an antenna connection terminal that is one of the plurality of external-connection terminals; and a second switching IC connected to the antenna connection terminal, the second switching IC being different from the first switching IC. In the above-described module board, the plurality of external-connection terminals are disposed on the second principal surface, and at least one of the first switching IC or the second switching IC is disposed on the second principal surface.

Advantageous Effects

According to the present disclosure, it is possible to provide a radio frequency module and a communication device with reduced sizes and reduced transfer loss.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 3 is a graph illustrating a comparison of frequency characteristics of the switches according to the embodiment and the comparison example.

FIG. 4A is a schematic diagram illustrating a plan view configuration of a radio frequency module according to a working example.

FIG. 5A is a schematic diagram illustrating a plan view configuration of a radio frequency module according to Variation 2.

DESCRIPTION OF EMBODIMENTS

Figure 1:
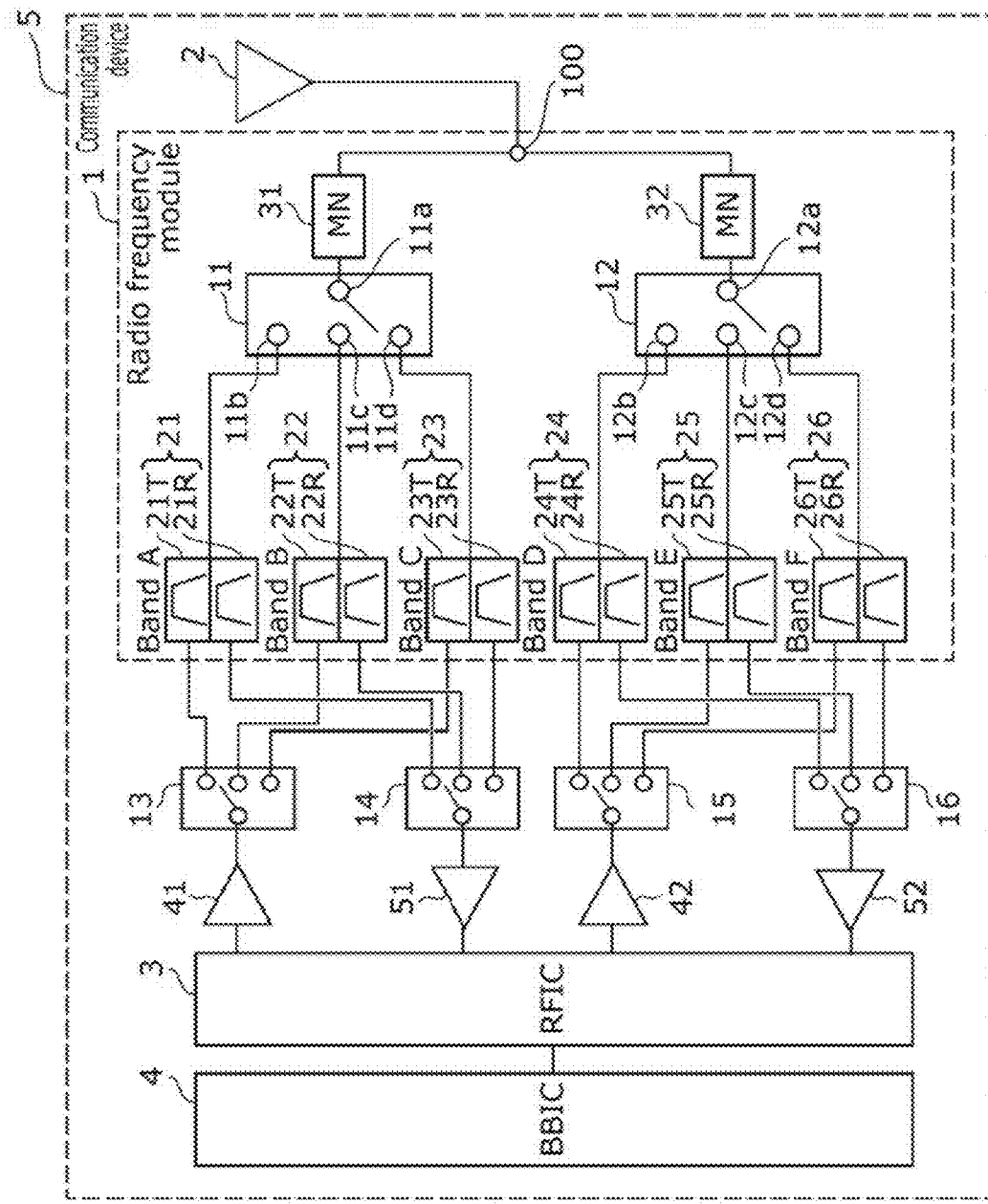
FIG. 1 is a diagram illustrating a circuit configuration of a radio frequency module (or RF front-end circuitry) and a communication device according to an embodiment.

The following describes in detail embodiments of the present disclosure. Each of the embodiments described below illustrates a general or specific example. The numerical values, shapes, materials, structural components, the arrangement and connection of the structural components, and so on, illustrated in the following embodiments, working examples, and variations are mere examples, and therefore do not limit the present disclosure. Among the structural components in the following working examples and variations, structural components not recited in the independent claims are described as arbitrary structural components. In addition, the sizes of structural components and the ratios of the sizes in the drawings are not necessarily strictly illustrated. In each of the diagrams, substantially the same structural components are denoted by the same reference signs, and redundant description may be omitted or simplified.

In addition, in the following description, terms indicating relationships between components such as parallel and vertical and terms indicating the shapes of components such as a quadrilateral shape, and numerical ranges do not represent only the strict meanings but include also a substantially equivalent range, such as a difference of approximately several percent.

In addition, in the following description, in an example of A, B, and C being mounted on a board, "in a plan view of the board (or the principal surface of the board), C is disposed between A and B" means that at least one of a plurality of line segments connecting arbitrary points in A and arbitrary points in B passes through a region in C in a plan view of the board. Furthermore, a plan view of the board means that the board and circuit elements mounted on the board are orthographically projected on a plane parallel to the principal surface of the board.

In addition, in the following description, a "transmission path" refers to a transfer path including a line along which a radio frequency transmission signal propagates, an electrode directly connected to the line, a terminal directly connected to the line or the electrode, etc. Furthermore, a "reception path" refers to a transfer path including a line along which a radio frequency reception signal propagates, an electrode directly connected to the line, a terminal directly connected to the line or the electrode, etc.

In addition, in the following description, "A and B are connected to each other" is applied to not only the case where A and B are physically connected to each other but also the case where A and B are electrically connected to each other.

Embodiment

1. Circuit Configuration of Radio Frequency Module 1 and Communication Device 5

FIG. 1 is a diagram illustrating a circuit configuration of radio frequency module 1 and communication device 5 according to an embodiment. As illustrated in this diagram, communication device 5 includes radio frequency module 1, antenna 2, RF signal processing circuit (RFIC) 3, baseband signal processing circuit (BBIC) 4, switches 13, 14, 15, and 16, power amplifiers 41 and 42, and low noise amplifiers 51 and 52.

RFIC 3 is an RF signal processing circuit that processes a radio frequency signal to be transmitted by antenna 2 and processes a radio frequency signal received by antenna 2. More specifically, RFIC 3 performs signal processing, by down-conversion or the like, on a reception signal input via the reception signal path of radio frequency module 1, and outputs the reception signal generated by the signal processing to BBIC 4. In addition, RFIC 3 performs signal processing, by up-conversion or the like, on a transmission signal input from BBIC 4, and outputs the transmission signal generated by the signal processing to the transmission signal path of radio frequency module 1.

BBIC 4 is a circuit that performs signal processing using an intermediate frequency band having a lower frequency than a frequency band of a radio frequency signal that is transferred through radio frequency module 1. The signal processed by BBIC 4 is, for example, used as an image signal for image display or as a sound signal for telephone conversation via a speaker.

RFIC 3 also functions as a controller that controls the connection of switches 13 to 16 and switches 11 and 12 included in radio frequency module 1, based on a communication band (frequency band) used. More specifically, RFIC 3 controllably switches connection between switches 11 to 16 by a control signal (not illustrated). It should be noted that the controller may be disposed outside RFIC 3, and may be disposed, for example, in radio frequency module 1 or BBIC 4.

Antenna 2 is connected to antenna connection terminal 100 of radio frequency module 1, and emits a radio frequency signal that has been output from radio frequency module 1. In addition, antenna 2 receives a radio frequency signal from the outside, and outputs the received radio frequency signal to radio frequency module 1.

It should be noted that, in communication device 5 according to the present embodiment, antenna 2 and BBIC 4 are not indispensable components, and thus communication device 5 may include interface ports to receive antenna 2 and BBIC 4 as auxiliary components.

Next, a detailed configuration of radio frequency module 1 will be described.

As illustrated in FIG. 1, radio frequency module 1 includes switches 11 and 12, duplexers 21, 22, 23, 24, 25, and 26, and matching circuits 31 and 32.

Antenna connection terminal 100 is one of a plurality of external connection terminals, and is connected to antenna 2.

Switch 11 is one example of a first switching integrated circuit (IC), and is a single pole three throw (SP3T) antenna switch that includes common terminal 11a (a first common terminal), selection terminal 11b (a first selection terminal), selection terminal 11c (a second selection terminal), and selection terminal 11d. Switch 11 is formed using a single semiconductor IC. Switch 11 connects and disconnects common terminal 11a and selection terminal 11b, connects and disconnects common terminal 11a and selection terminal 11c, and connects and disconnects common terminal 11a and selection terminal 11d. Common terminal 11a is connected to antenna connection terminal 100 via matching circuit 31. Selection terminal 11b is connected to duplexer 21. Selection terminal 11c is connected to duplexer 22. Selection terminal 11d is connected to duplexer 23.

Switch 12 is one example of a second switching IC, and is an SP3T antenna switch that includes common terminal 12a (a second common terminal), selection terminal 12b (a third selection terminal), selection terminal 12c (a fourth selection terminal), and selection terminal 12d. Switch 12 is implemented using a single semiconductor IC. Switch 12 connects and disconnects common terminal 12a and selection terminal 12b, connects and disconnects common terminal 12a and selection terminal 12c, and connects and disconnects common terminal 12a and selection terminal 12d. Common terminal 12a is connected to antenna connection terminal 100 via matching circuit 32. Selection terminal 12b is connected to duplexer 24. Selection terminal 12c is connected to duplexer 25. Selection terminal 12d is connected to duplexer 26.

The semiconductor IC forming switch 11 and the semiconductor IC forming switch 12 are each configured by, for example, a complementary metal oxide semiconductor (CMOS). More specifically, the semiconductor IC is fabricated by silicon on insulator (SOI) processing. This allows manufacturing the semiconductor IC at low cost. It should be noted that the semiconductor IC may include at least one of GaAs, SiGe, or GaN. With this, it is possible to output a radio frequency signal having a high-quality amplification performance and noise performance.

Duplexer 21 includes transmission filter 21T and reception filter 21R. Transmission filter 21T is one example of a first filter, and has a transmission band of communication band A (a first passband) as a passband. Reception filter 21R is one example of the first filter, and has a reception band of communication band A (the first passband) as a passband. The output terminal of transmission filter 21T and the input terminal of reception filter 21R are connected to selection terminal 11b. The input terminal of transmission filter 21T is connected to a first selection terminal of switch 13. The output terminal of reception filter 21R is connected to a first selection terminal of switch 14.

Duplexer 22 includes transmission filter 22T and reception filter 22R. Transmission filter 22T is one example of a second filter, and has a transmission band of communication band B (a second passband) as a passband. Reception filter 22R is one example of the second filter, and has a reception band of communication band B (the second passband) as a passband. The output terminal of transmission filter 22T and the input terminal of reception filter 22R are connected to selection terminal 11c. The input terminal of transmission filter 22T is connected to a second selection terminal of switch 13. The output terminal of reception filter 22R is connected to a second selection terminal of switch 14.

Duplexer 23 includes transmission filter 23T and reception filter 23R. Transmission filter 23T has a transmission band of communication band C as a passband. Reception filter 23R has a reception band of communication band C as a passband. The output terminal of transmission filter 23T and the input terminal of reception filter 23R are connected to selection terminal 11d. The input terminal of transmission filter 23T is connected to a third selection terminal of switch 13. The output terminal of reception filter 23R is connected to a third selection terminal of switch 14.

Duplexer 24 includes transmission filter 24T and reception filter 24R. Transmission filter 24T is one example of a third filter, and has a transmission band of communication band D (a third passband) as a passband. Reception filter 24R is one example of the third filter, and has a reception band of communication band D (the third passband) as a passband. The output terminal of transmission filter 24T and the input terminal of reception filter 24R are connected to selection terminal 12b. The input terminal of transmission filter 24T is connected to a first selection terminal of switch 15. The output terminal of reception filter 24R is connected to a first selection terminal of switch 16.

Duplexer 25 includes transmission filter 25T and reception filter 25R. Transmission filter 25T is one example of a fourth filter, and has a transmission band of communication band E (a fourth passband) as a passband. Reception filter 25R is one example of the fourth filter, and has a reception band of communication band E (the fourth passband) as a passband. The output terminal of transmission filter 25T and the input terminal of reception filter 25R are connected to selection terminal 12c. The input terminal of transmission filter 25T is connected to a second selection terminal of switch 15. The output terminal of reception filter 25R is connected to a second selection terminal of switch 16.

Duplexer 26 includes transmission filter 26T and reception filter 26R. Transmission filter 26T has a transmission band of communication band F as a passband. Reception filter 26R has a reception band of communication band F as a passband. The output terminal of transmission filter 26T and the input terminal of reception filter 26R are connected to selection terminal 12d. The input terminal of transmission filter 26T is connected to a third selection terminal of switch 15. The output terminal of reception filter 26R is connected to a third selection terminal of switch 16.

It should be noted that communication bands A, B, and C are, for example, communication bands that belong to the middle band group (1.45 GHz to 2.2 GHz), and communication bands D, E, and F are, for example, communication bands that belong to the high band group (2.3 GHz to 2.7 GHz).

In addition, it is sufficient if the number of the duplexers connected to switch 11 and the number of the duplexers connected to switch 12 are each at least two. However, the passband of the at least two duplexers connected to switch 11 and the passband of the at least two duplexers connected to switch 12 are separated at a predetermined boundary frequency, and thus the frequencies are not overlap.

It should be noted that, in radio frequency module 1 according to the present embodiment, although the transmission filter and the reception filter of each of the communication bands are included in a duplexer for transferring a transmission signal and a reception signal in a frequency division duplex (FDD) system, the transmission signal and the reception signal may be transferred in a time division duplex (TDD) system. In this case, a switch for switching between transmission and reception is disposed on at least one of a preceding stage or a following stage of the transmission filter and the reception filter.

It should be noted that the above-described transmission filters 21T to 26T and reception filters 21R to 26R may be, for example, one of a surface acoustic wave filter, an acoustic wave filter using a bulk acoustic wave (BAW), an LC resonant filter, and a dielectric filter, but not limited to these filters.

Matching circuit 31 is connected between antenna connection terminal 100 and switch 11, and matches the impedance of antenna 2 with the impedance of switch 11. Matching circuit 32 is connected between antenna connection terminal 100 and switch 12, and matches the impedance of antenna 2 with the impedance of switch 12. Matching circuits 31 and 32 each include at least one of an inductor or a capacitor.

The impedance when matching circuit 31 is viewed from antenna connection terminal 100 is, for example, in a substantially open state at the frequency band of communication bands D, E, and F, and the impedance when matching circuit 32 is viewed from antenna connection terminal 100 is, for example, in a substantially open state at the frequency band of communication bands A, B, and C. With this, it is possible to improve the isolation between the radio frequency signals of communication bands A, B, and C and the radio frequency signals of communication bands D, E, and F.

It should be noted that, when the isolation between the radio frequency signals of communication bands A, B, and C and the radio frequency signals of communication bands D, E, and F is sufficiently ensured by switching between connection and disconnection performed by switches 11 and 12, matching circuits 31 and 32 need not necessarily be provided. In this case, the first common terminal of switch 11 is directly connected to antenna connection terminal 100, and the second common terminal of switch 12 is directly connected to antenna connection terminal 100. In addition, a matching circuit may be disposed between switch 11 and at least one of duplexers 21 to 23. In addition, a matching circuit may be disposed between switch 12 and at least one of duplexers 24 to 26.

Switch 13 is configured by an SP3T switching circuit that includes a common terminal, a first selection terminal, a second selection terminal, and a third selection terminal. The common terminal of switch 13 is connected to power amplifier 41. Switch 14 is configured by an SP3T switching circuit that includes a common terminal, a first selection terminal, a second selection terminal, and a third selection terminal. The common terminal of switch 14 is connected to power amplifier 51.

Switch 15 is configured by an SP3T switching circuit that includes a common terminal, a first selection terminal, a second selection terminal, and a third selection terminal. The common terminal of switch 15 is connected to power amplifier 42. Switch 16 is configured by an SP3T switching circuit that includes a common terminal, a first selection terminal, a second selection terminal, and a third selection terminal. The common terminal of switch 16 is connected to power amplifier 52.

Power amplifier 41 is a transmission amplifier that amplifies transmission signals of communication bands A, B, and C. Power amplifier 41 includes an input terminal connected to RFIC 3, and an output terminal connected to switch 13. Power amplifier 42 is a transmission amplifier that amplifies transmission signals of communication bands D, E, and F. Power amplifier 42 includes an input terminal connected to RFIC 3, and an output terminal connected to switch 15.

Low noise amplifier 51 is a reception amplifier that amplifies reception signals of communication bands A, B, and C. Low noise amplifier 51 includes an input terminal connected to switch 14, and an output terminal connected to RFIC 3. Low noise amplifier 52 is a reception amplifier that amplifies reception signals of communication bands D, E, and F. Low noise amplifier 52 includes an input terminal connected to switch 16, and an output terminal connected to RFIC 3.

Power amplifiers 41 and 42 and low noise amplifiers 51 and 52 include, for example, a field-effect transistor (FET), a hetero-junction bipolar transistor (HBT), etc. which include a Si complementary metal oxide semiconductor (CMOS) or GaAs as a material.

It should be noted that switches 13 to 16 may be included in radio frequency module 1. In addition, power amplifiers 41 and 42 and low noise amplifiers 51 and 52 may be included in radio frequency module 1.

According to the above-described circuit configuration, radio frequency module 1 according to the present embodiment is capable of performing at least one of simultaneously transmitting, simultaneously receiving, or simultaneously transmitting and receiving a radio frequency signal of at least one of communication bands A, B, and C and a radio frequency signal of at least one of communication bands D, E, and F.

It should be noted that it is sufficient if the radio frequency module according to the present disclosure includes switches 11 and 12 and duplexers 21, 22, 24, and 25. In this case, matching circuits 31 and 32 and duplexers 23 and 26 need not necessarily be provided. In addition, only one of the transmission filter and the reception filter may be provided in place of each of duplexers 21 to 26.

Figure 2A:
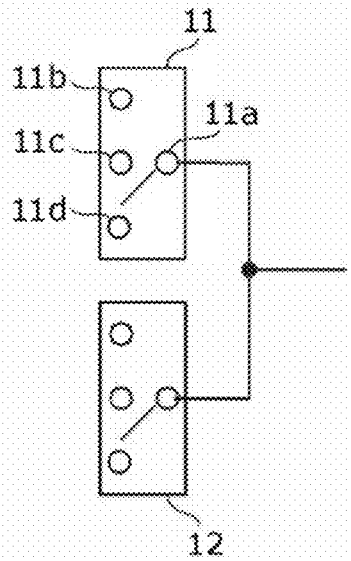
FIG. 2A is a diagram illustrating circuit configurations of switches according to the embodiment.
Figure 2B:
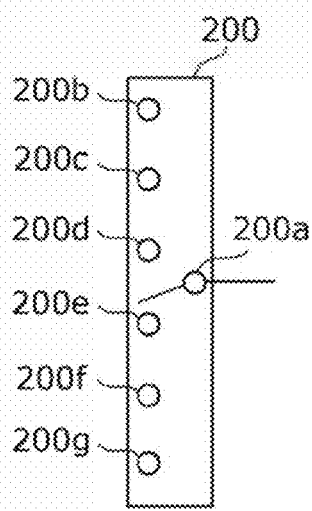
FIG. 2B is a diagram illustrating a circuit configuration of a switch according to a comparison example.
Figure 2C:
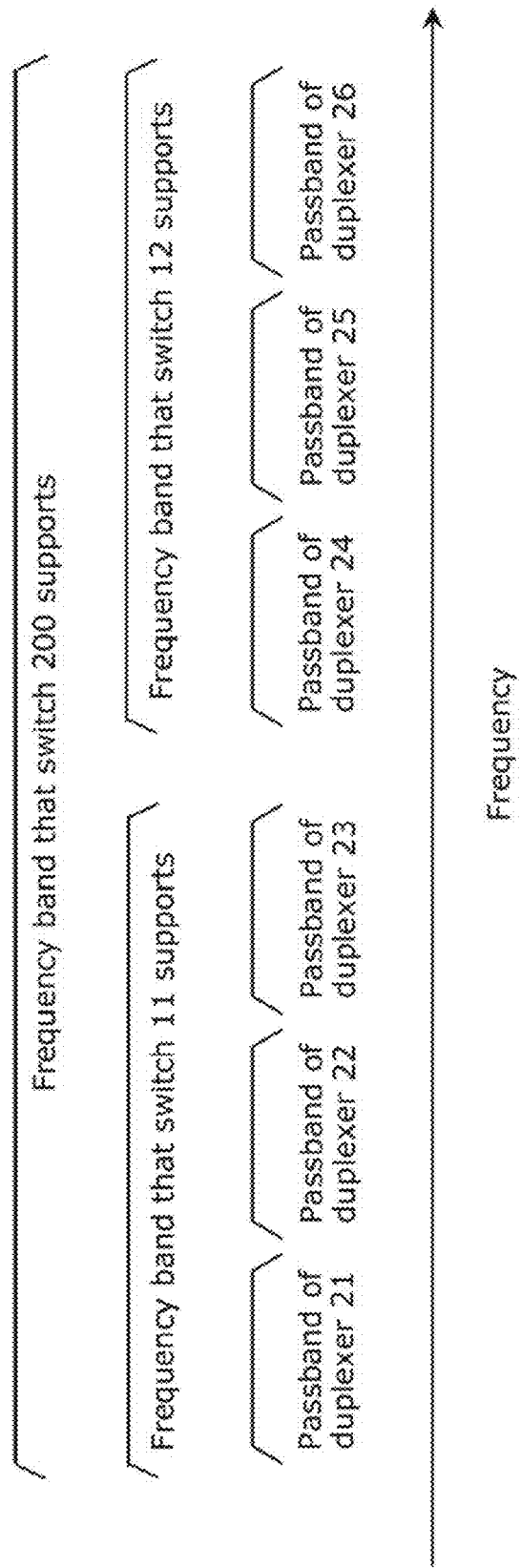
FIG. 2C is a diagram illustrating a relationship between the frequency bands that the respective switches and the respective duplexers support.

FIG. 2A illustrates circuit configurations of switches 11 and 12 included in radio frequency module 1 according to the embodiment. FIG. 2B is a diagram illustrating a circuit configuration of switch 200 according to a comparison example. FIG. 2C is a diagram illustrating a relationship between the frequency bands that the respective switches and the respective duplexers support.

In radio frequency module 1 according to the embodiment, switch 11 for transferring radio frequency signals of communication bands A, B, and C and switch 12 for transferring communication bands D, E, and F are formed using different semiconductor ICs, as illustrated in FIG. 2A. In contrast, switch 200 according to the comparison example includes a single common terminal 200a and six selection terminals 200b, 200c, 200d, 200e, 200f, and 200g. Duplexer 21 is connected to selection terminal 200b, duplexer 22 is connected to selection terminal 200c, duplexer 23 is connected to selection terminal 200d, duplexer 24 is connected to selection terminal 200e, duplexer 25 is connected to selection terminal 200f, and duplexer 26 is connected to selection terminal 200g. In other words, in the comparison example, radio frequency signals of communication bands A, B, C, D, E, and F are transferred via a single switch 200.

FIG. 2C illustrates a relationship between the passbands of duplexer 21 to 26 and the frequency bands that switches 11, 12, and 200 support.

In radio frequency module 1 according to the present embodiment, the passband of duplexer 21, the passband of duplexer 22, the passband of duplexer 23, the passband of duplexer 24, the passband of duplexer 25, and the passband of duplexer 26 are in an order of frequency from lowest to highest. In addition, the frequencies of the passbands of duplexers 21 to 23 do not overlap the frequencies of the passband of duplexers 24 to 26. It should be noted that, the passband of duplexer 21, the passband of duplexer 22, the passband of duplexer 23, the passband of duplexer 24, the passband of duplexer 25, and the passband of duplexer 26 may be in an order of frequency from highest to lowest.

As illustrated in FIG. 2C, the frequency range that switch 11 according to the embodiment needs to support includes the pass bands of duplexers 21 to 23, and the frequency range that switch 12 according to the embodiment needs to support includes the pass bands of duplexers 24 to 26. Meanwhile, the frequency range that switch 200 according to the comparison example needs to support includes the pass bands of duplexers 21 to 26. Accordingly, the frequency range that each of switches 11 and 12 needs to support is narrower than the frequency range that switch 200 needs to support.

FIG. 3 is a graph illustrating a comparison of frequency characteristics of switch 11 according to the embodiment and switch 200 according to the comparison example. The diagram illustrates the passing characteristics of switch 11 in the case where, in switch 11, common terminal 11a and selection terminal 11b are connected, and common terminal 11a and the other selection terminals are disconnected. In addition, the diagram illustrates the passing characteristics of switch 200 in the case where, in switch 200, common terminal 200a and selection terminal 200b are connected, and common terminal 200a and the other selection terminals are disconnected.

As illustrated in FIG. 3, in the frequency band including communication bands A to F (i.e., the frequency range less than or equal to 3 GHz), the insertion loss of switch 11 is smaller than the insertion loss of switch 200. In other words, switch 11 transfers radio frequency signals less than or equal to 3 GHz with lower loss than switch 200. This results from the following factors, for example. (1) The length of the line between the common terminal and each of the selection terminals can be made shorter in switch 11 than in switch 200. (2) Since switch 11 includes fewer selection terminals than switch 200, it is possible to reduce the influence of the off capacitance between the common terminal and the selection terminals that are disconnected. (3) Since the input/output impedance can be adjusted in a narrower band range in switch 11 than in switch 200, it is possible to optimize the impedance with high precision. In other words, the passing characteristics of the radio frequency module deteriorates when switch 11 and switch 12 are configured by a single semiconductor IC, for example, as a single switch 200.

In addition, when the above-described circuit configuration is implemented by a single module, as a small-sized front-end circuit, with developments in multiband technologies, the circuit size becomes larger and an increase in size is accelerated as the number of communication bands used increases. In addition, the lengths of the lines connecting an antenna with switches 11 and 12 become longer, leading to an increase in the transfer loss.

In contrast, radio frequency module 1 according to the present embodiment has a configuration with a reduced size and reduced transfer loss. The following describes an arrangement configuration of circuit components included in radio frequency module 1 according to the present embodiment.

Figure 4B:
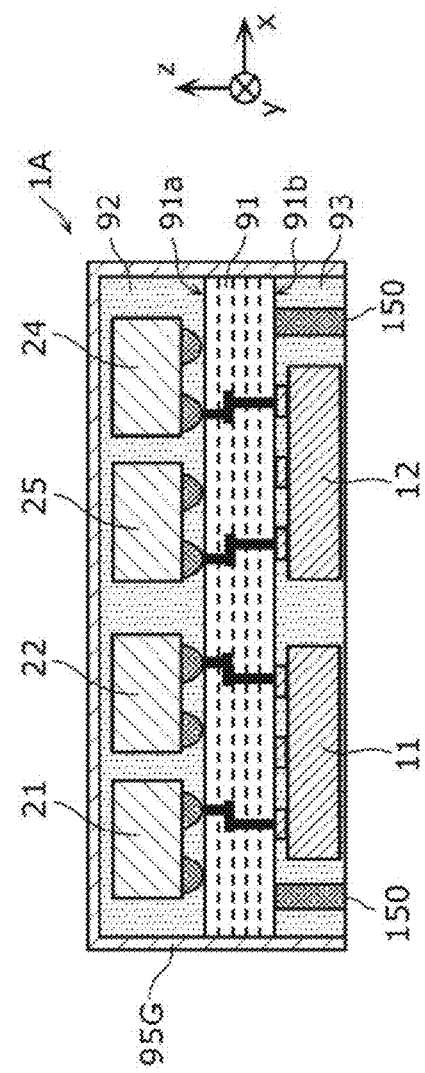
FIG. 4B is a schematic diagram illustrating a cross-sectional configuration of the radio frequency module according to the working example.

2. Arrangement Configuration of Circuit Elements of Radio Frequency Module 1A According to Working Example FIG. 4A is a schematic diagram illustrating a plan view configuration of radio frequency module 1A according to a working example, with (a) showing a plan view with principal surface 91a facing-up, and (b) showing the opposite orientation (i.e., 91b facing-up and 91a facing-down). FIG. 4B is a schematic diagram illustrating a cross-sectional configuration of radio frequency module 1A according to the working example. More specifically, FIG. 4B is a cross-sectional view taken along line IVB-IVB of FIG. 4A. It should be noted that (a) in FIG. 4A illustrates a layout of the circuit elements when, of principal surfaces 91a and 91b located on opposite sides of module board 91, principal surface 91a is viewed from the z-axis positive side. Meanwhile, (b) in FIG. 4A illustrates a perspective view of the layout of the circuit elements when principal surface 91b is also viewed from the z-axis positive side.

Radio frequency module 1A according to the working example specifically illustrates the arrangement configuration of the respective circuit elements included in radio frequency module 1 according to the embodiment.

As illustrated in FIG. 4A and FIG. 4B, radio frequency module 1A according to the present working example further includes module board 91, external-connection terminals 150, resin components 92 and 93, and shielding layer 95G in addition to the circuit configuration illustrated in FIG. 1.

Module board 91 is a board which includes principal surface 91a (a first principal surface) and principal surface 91b (a second principal surface) on opposite sides thereof, and serves as a double-sided mounting board capable of mounting the circuit components that radio frequency module 1 includes. As module board 91, for example, a low temperature co-fired ceramic (LTCC) board having a stacked structure including a plurality of dielectric layers, a high temperature co-fired ceramic (HTCC) board, a component built-in board, a board including a redistribution layer (RDL), or a printed board or the like is used.

Resin component 92 is disposed to cover principal surface 91a of module board 91, and has a function of ensuring reliability such as mechanical strength and moisture resistance of the circuit components mounted on principal surface 91a. Resin component 93 is disposed to cover principal surface 91b of module board 91, and has a function of ensuring reliability such as mechanical strength and moisture resistance of the circuit components mounted on principal surface 91b. It should be noted that resin components 92 and 93 are not indispensable components for the radio frequency module according to the present disclosure.

It should be noted that, in the present working example, matching circuit 31 at least includes a chip inductor, and matching circuit 32 at least includes a chip inductor.

As illustrated in FIG. 4A and FIG. 4B, in radio frequency module 1A according to the present working example, duplexers 21 to 26 and matching circuits 31 and 32 are disposed on principal surface 91a of module board 91. Meanwhile, switches 11 and 12 are mounted on principal surface 91b of module board 91.

A plurality of external-connection terminals 150 are disposed on principal surface 91b of module board 91. Radio frequency module 1A exchanges electrical signals with a motherboard disposed on the z-axis negative side of radio frequency module 1A via the plurality of external-connection terminals 150. Antenna connection terminal 100 is one of the plurality of external connection terminals 150. In addition, one or some of the plurality of external-connection terminals 150 are set to the ground potential of the motherboard.

Since switches 11 and 12, which are components that are short in height, are arranged, of principal surfaces 91a and 91b, on principal surface 91b facing the motherboard, it is possible to reduce the height of radio frequency module 1A as a whole.

According to the above-described configuration, the circuit components included in radio frequency module 1A are separately disposed on principal surface 91a and principal surface 91b of module board 91. As a result, it is possible to reduce the size of radio frequency module 1A. In addition, the switching circuit connected to antenna connection terminal 100 separately includes switch 11 that supports communication bands A, B, and C, and switch 12 that supports communication bands D, E, and F, and thus it is possible to transfer radio frequency signals of communication bands A to F with lower loss compared with a radio frequency module in which the switching circuit connected to antenna connection terminal 100 is configured by a single switch. Furthermore, switches 11 and 12 are disposed on principal surface 91b on which antenna connection terminal 100 is disposed, and thus it is possible to reduce the lengths of the lines connecting antenna connection terminal 100 to switches 11 and 12. As a result, it is possible to reduce the transfer loss of radio frequency signals. Thus, it is possible to provide radio frequency module 1A with a reduced size and reduced transfer loss.

In addition, in radio frequency module 1A according to the present working example, switch 11 is disposed on principal surface 91b, and duplexers 21 to 23 are disposed on principal surface 91a. According to this configuration, switch 11 that transfers radio frequency signals of communication bands A, B, and C and duplexers 21 to 23 are disposed separately on both sides. As a result, it is possible to reduce the size of radio frequency module 1A.

In addition, as illustrated in FIG. 4A, in a plan view of module board 91, it is desirable that switch 11 at least partially overlap each of duplexers 21 and 22. According to this configuration, it is possible to reduce the lengths of the lines connecting switch 11 to duplexers 21 and 22. As a result, it is possible to reduce the transfer loss of radio frequency signals of communication bands A and B.

In addition, in radio frequency module 1A according to the present working example, switch 12 is disposed on principal surface 91b, and duplexers 24 to 26 are disposed on principal surface 91a. According to this configuration, switch 12 that transfers radio frequency signals of communication bands D, E, and F and duplexers 24 to 26 are disposed separately on both sides. As a result, it is possible to reduce the size of radio frequency module 1A.

In addition, as illustrated in FIG. 4A, in a plan view of module board 91, it is desirable that switch 12 at least partially overlap each of duplexers 24 and 25. According to this configuration, it is possible to reduce the lengths of the lines connecting switch 12 to duplexers 24 and 25. As a result, it is possible to reduce the transfer loss of radio frequency signals of communication bands D and E.

It should be noted that, as illustrated in FIG. 4B, radio frequency module 1A may further include shielding layer 95G that covers the front surface and lateral surfaces of resin component 92 and the lateral surfaces of resin component 93, and is set to a ground potential. According to this configuration, the electromagnetic field shielding function of radio frequency module 1A for shielding from an external circuit is improved.

It should be noted that at least one of switches 13 to 16, power amplifiers 41 and 42, or low noise amplifiers 51 and 52 illustrated in FIG. 1 may be disposed on module board 91.

3. Arrangement Configuration of Circuit Elements of Radio Frequency Module 1B According to Variation 1

It should be noted that external-connection terminals 150 may be columnar electrodes that penetrate through resin component 93 in the z-axis direction as illustrated in FIG. 4B, or may be bump electrodes.

Figure 4C:
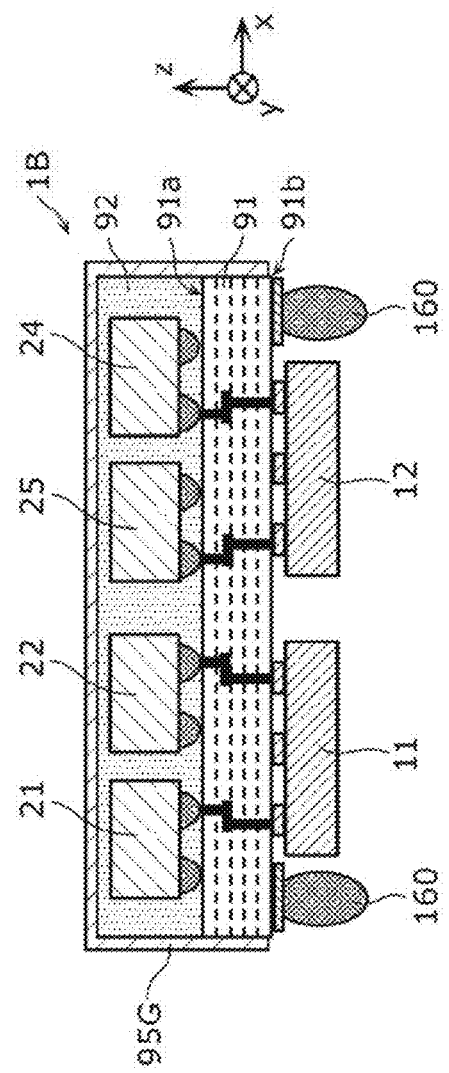
FIG. 4C is a schematic diagram illustrating a cross-sectional configuration of a radio frequency module according to Variation 1.

FIG. 4C is a schematic diagram illustrating a plan view configuration of radio frequency module 1B according to Variation 1. Radio frequency module 1B as illustrated in FIG. 4C is different from radio frequency module 1A according to the working example in that bump electrodes 160 are disposed instead of external-connection terminals 150, and that resin component 93 is not disposed on the principal surface 91b side.

4. Arrangement Configuration of Circuit Elements of Radio Frequency Module 1C According to Variation 2

Figure 5B:
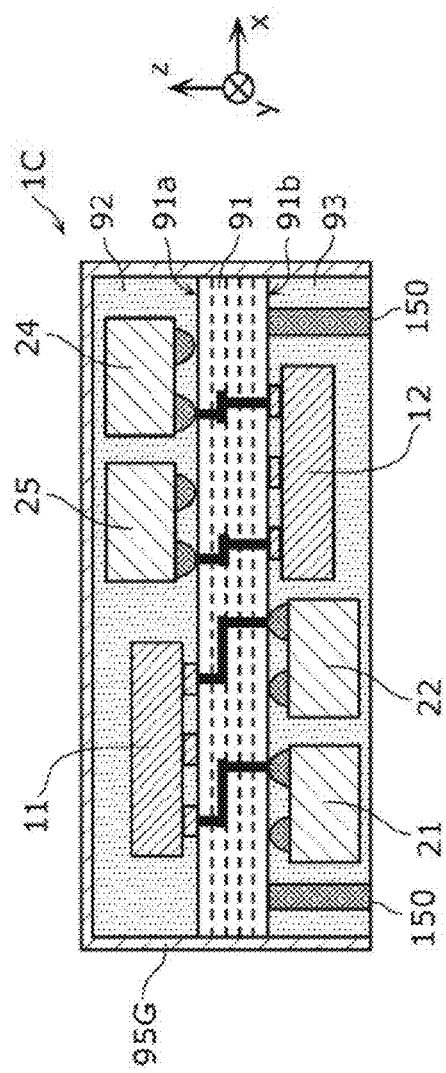
FIG. 5B is a schematic diagram illustrating a cross-sectional configuration of the radio frequency module according to Variation 2.

FIG. 5A is a schematic diagram illustrating a plan view configuration of radio frequency module 1C according to Variation 2. FIG. 5B is a schematic diagram illustrating a cross-sectional configuration of radio frequency module 1C according to Variation 2. More specifically, FIG. 5B is a cross-sectional view taken along line VB-VB of FIG. 5A. It should be noted that (a) in FIG. 5A illustrates a layout of the circuit elements when, of principal surfaces 91a and 91b located on opposite sides of module board 91, principal surface 91a is viewed from the z-axis positive side. Meanwhile, (b) in FIG. 5A illustrates a perspective view of the layout of the circuit elements when principal surface 91b is viewed from the z-axis positive side.

Radio frequency module 1C according to Variation 2 specifically illustrates the arrangement configuration of the respective circuit elements included in radio frequency module 1 according to the embodiment.

As illustrated in FIG. 5A and FIG. 5B, radio frequency module 1C according to the present variation further includes module board 91, external-connection terminals 150, resin components 92 and 93, and shielding layer 95G in addition to the circuit configuration illustrated in FIG. 1.

Radio frequency module 1C according to the present variation is different from radio frequency module 1A according to the working example only in the arrangement configuration of the circuit elements included in radio frequency module 1C. Hereinafter, radio frequency module 1C according to the present variation will be described. In the description, the same points as those of radio frequency module 1A according to the working example will be omitted, and different points will be mainly described.

As illustrated in FIG. 5A and FIG. 5B, in radio frequency module 1C according to the present variation, switch 11, duplexers 24 to 26, and matching circuit 32 are disposed on principal surface 91a of module board 91. Meanwhile, switch 12, duplexers 21 to 23, and matching circuit 31 are mounted on principal surface 91b of module board 91.

A plurality of external-connection terminals 150 are disposed on principal surface 91b of module board 91. Antenna connection terminal 100 is one of the plurality of external connection terminals 150.

According to the above-described configuration, the circuit components included in radio frequency module 1C are separately disposed on principal surface 91a and principal surface 91b of module board 91. As a result, it is possible to reduce the size of radio frequency module 1C. In addition, the switching circuit connected to antenna connection terminal 100 is divided into switch 11 that supports communication bands A, B, and C, and switch 12 that supports communication bands D, E, and F, and thus it is possible to transfer radio frequency signals of communication bands A to F with lower loss compared with a radio frequency module in which the switching circuit connected to antenna connection terminal 100 is configured by a single switch. Furthermore, switch 12 is disposed on principal surface 91b on which antenna connection terminal 100 is disposed, and thus it is possible to reduce the length of the line connecting antenna connection terminal 100 to switch 12. As a result, it is possible to reduce the transfer loss of radio frequency signals of communication bands D, E, and F. Thus, it is possible to provide radio frequency module 1C with a reduced size and reduced transfer loss.

In addition, in radio frequency module 1C according to the present variation, switch 11 is disposed on principal surface 91a, and duplexers 21 to 23 are disposed on principal surface 91b. According to this configuration, switch 11 that transfers radio frequency signals of communication bands A, B, and C and duplexers 21 to 23 are disposed separately on both sides. As a result, it is possible to reduce the size of radio frequency module 1C.

In addition, as illustrated in FIG. 5A, in a plan view of module board 91, it is desirable that switch 11 at least partially overlap each of duplexers 21 and 22. According to this configuration, it is possible to reduce the lengths of the lines connecting switch 11 to duplexers 21 and 22. As a result, it is possible to reduce the transfer loss of radio frequency signals of communication bands A and B.

5. Arrangement Configuration of Circuit Elements of Radio Frequency Module 1D According to Variation 3

Figure 6:
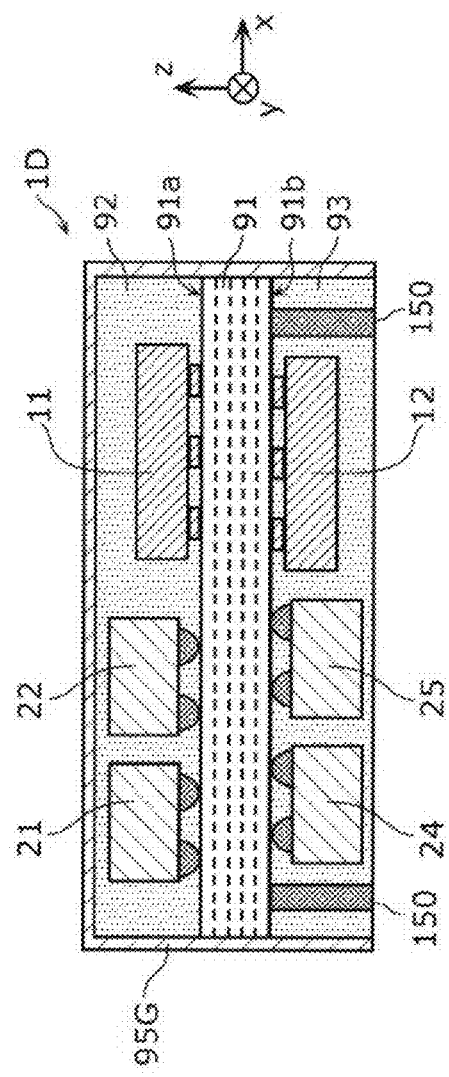
FIG. 6 is a schematic diagram illustrating a cross-sectional configuration of a radio frequency module according to Variation 3.

FIG. 6 is a schematic diagram illustrating a cross-sectional configuration of radio frequency module 1D according to Variation 3.

Radio frequency module 1D according to Variation 3 specifically illustrates the arrangement configuration of the respective circuit elements included in radio frequency module 1 according to the embodiment.

As illustrated in FIG. 6, radio frequency module 1D according to the present variation further includes module board 91, external-connection terminals 150, resin components 92 and 93, and shielding layer 95G in addition to the circuit configuration illustrated in FIG. 1.

Radio frequency module 1D according to the present variation is different from radio frequency module 1A according to the working example only in the arrangement configuration of the circuit elements included in radio frequency module 1D. Hereinafter, radio frequency module 1D according to the present variation will be described. In the description, the same points as those of radio frequency module 1A according to the working example will be omitted, and different points will be mainly described.

In radio frequency module 1D according to the present variation, switch 11 and duplexers 21 to 23 (duplexer 23 is not illustrated in FIG. 6) are disposed on principal surface 91a of module board 91. Meanwhile, switch 12 and duplexers 24 to 26 (duplexer 26 is not illustrated in FIG. 6) are disposed on principal surface 91b of module board 91.

A plurality of external-connection terminals 150 are disposed on principal surface 91b of module board 91. In addition, although not illustrated in FIG. 6, antenna connection terminal 100 is one of the plurality of external connection terminals 150.

According to the above-described configuration, the circuit components included in radio frequency module 1D are separately disposed on principal surface 91a and principal surface 91b of module board 91. As a result, it is possible to reduce the size of radio frequency module 1D. In addition, the switching circuit connected to antenna connection terminal 100 is divided into switch 11 that supports communication bands A, B, and C, and switch 12 that supports communication bands D, E, and F, and thus it is possible to transfer radio frequency signals of communication bands A to F with lower loss compared with a radio frequency module in which the switching circuit connected to antenna connection terminal 100 is configured by a single switch. Furthermore, switch 12 is disposed on principal surface 91b on which antenna connection terminal 100 is disposed, and thus it is possible to reduce the length of the line connecting antenna connection terminal 100 to switch 12. As a result, it is possible to reduce the transfer loss of radio frequency signals of communication bands D, E, and F. Thus, it is possible to provide radio frequency module 1D with a reduced size and reduced transfer loss.

In addition, in radio frequency module 1D according to the present variation, switch 11 that transfers radio frequency signals of communication bands A, B, and C and duplexers 21 to 23 are disposed on principal surface 91a, and switch 12 that transfers radio frequency signals of communication bands D, E, and F and duplexers 24 to 26 are disposed on principal surface 91b. According to this configuration, the transfer path of the radio frequency signals of communication bands A, B, and C is separated from the transfer path of the radio frequency signals of communication bands D, E, and F by module board 91. As a result, the isolation between the radio frequency signals of communication bands A, B, and C and the radio frequency signals of communication bands D, E, and F is improved.

6. Advantageous Effects, Etc

As described above, radio frequency module 1 according to the embodiment includes module board 91 including principal surface 91a and principal surface 91b on opposite sides of module board 91, and capable of mounting circuit components on both principal surface 91a and principal surface 91b; a plurality of external-connection terminals 150; switch 11 connected to antenna connection terminal 100 that is one of the plurality of external-connection terminals 150; and switch 12 that is connected to antenna connection terminal 100, and is different from switch 11. In module board 91, the plurality of external-connection terminals 150 are disposed on principal surface 91b, and at least one of the first switching IC or the second switching IC is disposed on principal surface 91a.

According to the above-described configuration, the circuit components included in radio frequency module 1 are separately disposed on principal surface 91a and principal surface 91b, and thus it is possible to reduce the size of radio frequency module 1. In addition, the switching circuit connected to antenna connection terminal 100 is divided into switch 11 and switch 12, and thus it is possible to transfer radio frequency signals with lower loss compared with a radio frequency module in which the switching circuit connected to antenna connection terminal 100 is configured by a single switch. Furthermore, one of switches 11 and 12 is disposed on principal surface 91b on which antenna connection terminal 100 is disposed, and thus it is possible to reduce the length of the line connecting antenna connection terminal 100 to the one of switches 11 and 12. As a result, it is possible to reduce the transfer loss of radio frequency signals that pass through the one of switches 11 and 12. Thus, it is possible to provide radio frequency module 1 with a reduced size and reduced transfer loss.

In addition, switch 11 may include common terminal 11a, selection terminal 11b, and selection terminal 11c, switch 12 may include common terminal 12a, selection terminal 12b, and selection terminal 12c, and radio frequency module 1 may further include: duplexer 21 connected to selection terminal 11b, and having communication passband A; duplexer 22 connected to selection terminal 11c, and having communication passband B; duplexer 24 connected to selection terminal 12b, and having communication passband D; and duplexer 25 connected to selection terminal 12c, and having communication passband E.

In addition, in radio frequency modules 1A, 1B, and 1C, switch 12 may be disposed on principal surface 91b, and duplexers 24 and 25 may be disposed on principal surface 91a.

According to this configuration, switch 12 that transfers radio frequency signals of communication bands D and E, and duplexers 24 and 25 are disposed separately on both sides. As a result, it is possible to reduce the size of the radio frequency module.

In addition, in radio frequency modules 1A, 1B, and 1C, in a plan view of module board 91, switch 12 may at least partially overlap each of duplexer 24 and duplexer 25.

According to this configuration, it is possible to reduce the lengths of the lines connecting switch 12 to duplexers 24 and 25. As a result, it is possible to reduce the transfer loss of radio frequency signals of communication bands D and E.

In addition, in radio frequency modules 1A and 1B, switch 11 may be disposed on principal surface 91b, and duplexer 21 and duplexer 22 may be disposed on principal surface 91a.

According to this configuration, switch 11 that transfers radio frequency signals of communication bands A and B, and duplexers 21 and 22 are disposed separately on both sides. As a result, it is possible to reduce the size of the radio frequency module.

In addition, in radio frequency module 1C, switch 11 is disposed on principal surface 91a, and duplexer 21 and duplexer 22 may be disposed on principal surface 91b.

According to this configuration, switch 11 that transfers radio frequency signals of communication bands A and B, and duplexers 21 and 22 are disposed separately on both sides. As a result, it is possible to reduce the size of the radio frequency module.

In addition, in radio frequency modules 1A, 1B, and 1C, in a plan view of module board 91, switch 11 may at least partially overlap each of duplexer 21 and duplexer 22.

According to this configuration, it is possible to reduce the lengths of the lines connecting switch 11 to duplexers 21 and 22. As a result, it is possible to reduce the transfer loss of radio frequency signals of communication bands A and B.

In addition, communication band A, communication band B, communication band C, communication band D, communication band E, and communication band F may be in an order of frequency from lowest to highest or from highest to lowest, and frequencies of communication bands A to C do not overlap frequencies of communication bands D to F.

According to this, since the input/output impedance of switch 11 can be adjusted in a narrowband frequency range, and the input/output impedance of switch 12 can be adjusted in a narrowband frequency range, it is possible to optimize the impedance for switches 11 and 12 with high precision. As a result, it is possible to transfer radio frequency signals of communication bands A to F that pass switches and 12 with low loss.

In addition, communication device 5 includes: RFIC 3 configured to process a radio frequency signal which is to be transmitted or has been received by antenna 2; and radio frequency module 1 configured to transfer the radio frequency signal between antenna 2 and RFIC 3.

According to the above-described configuration, it is possible to provide communication device 5 with a reduced size and reduced transfer loss.

Other Embodiments, Etc

Although the radio frequency module and the communication device according to the embodiment of the present disclosure have been described above based on the working examples and variations, the radio frequency module and the communication device according to the present disclosure are not limited to the foregoing working examples, and variations. The present disclosure also encompasses: other embodiments achieved by combining arbitrary structural components in the above-described working examples and variations; variations resulting from various modifications to the above-described working examples and variations that may be conceived by those skilled in the art without departing from the essence of the present disclosure; and various devices that include the above-described radio frequency module and the communication device.

For example, in the radio frequency module and the communication device according to the foregoing working examples and the variations, a passive element such as an inductor, a capacitor, or the like, and a line, etc. may be inserted in a path connecting circuit elements and a signal path which are disclosed in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable widely to communication apparatuses such as mobile phones as a radio frequency module disposed in a multiband-compatible front-end unit.

The invention claimed is:
1. A radio frequency module, comprising:
a power amplifier that amplifies a first radio frequency signal centered at a first RF frequency;
a low noise amplifier that amplifies a second radio frequency signal centered at a second RE frequency;
a module hoard including a first principal surface and a second principal surface on opposite sides of the module board; the first principal surface and the second principal surface each having at least one circuit component mounted thereon, the power amplifier mounted to one of the first principle surface and second principle surface, and the low noise amplifier mounted to one of the first principle surface and second principle surface;
a plurality of external-connection terminals;
a first switching integrated circuit (IC) connected to an antenna connection terminal that is one of the plurality of external-connection terminals, the first switching IC includes a first common terminal, a first selection terminal, and a second selection terminal, and the first switching IC being disposed on the first principle surface of the module board; and
a second switching IC connected to the antenna connection terminal, the second switching IC being different from the first switching IC, the second switching IC includes a second common terminal, a third selection terminal, and a fourth selection terminal;
a first filter connected to the first selection terminal and having a first passband that passes RF signals provided by the first switching IC, the first filter disposed on the first principle surface of the module board;
a second filter connected to the second selection terminal and having a second passband that passes RF signals provided by the first switching IC, the second filter disposed on the first principle surface of the module board;
a third filter connected to the third selection terminal and having a third passband that passes RF signals provided by the second switching IC, the third filter disposed on the second principle surface of the module board; and
a fourth filter connected to the fourth selection terminal and having a fourth passband that passes RF signals provided by the second switching IC, the fourth filter disposed on the second principle surface of the module board, wherein
the plurality of external-connection terminals are disposed on the second principal surface, and at least one of the first switching IC or the second switching IC is disposed on the second principal surface, and a first transfer path that passes RF signals from the first switching IC to the first filter and the second filter is separated by the module board from a second transfer path that passes RF signals from the second switching IC to the third filter and the fourth filter so as to isolate RF signals in the first RF passband and the second RF passband from other RF signals in the third RF passband and the fourth RF passband.

2. The radio frequency module according to claim 1, wherein the first pass band, the second pass band, the third pass band, and the fourth pass band are in an order of frequency from lowest to highest or from highest to lowest, and frequencies of the first pass band and the second pass band do not overlap frequencies of the third pass band and the fourth pass band.

3. A communication device, comprising:

a radio frequency (RF) signal processing circuit configured to process RF signals to be transmitted or received by an antenna;

a radio frequency module configured to transfer the radio frequency signal between the antenna and the RF signal processing circuit, the radio frequency module including a power amplifier that amplifies a first radio frequency signal centered at a first RF frequency, a low noise amplifier that amplifies a second radio frequency signal centered at a second RF frequency, a module board including a first principal surface and a second principal surface on opposite sides of the module board, the first principal surface and the second principal surface each having at least one circuit component mounted thereon, the power amplifier mounted to one of the first principle surface and second principle surface, and the low noise amplifier mounted to one of the first principle surface and second principle surface, a plurality of external-connection terminals, a first switching integrated circuit (IC) connected to an antenna connection terminal that is one of the plurality of external-connection terminals, the first switching IC includes a first common terminal, a first selection terminal, and a second selection terminal, and the first switching IC being disposed on the first principle surface of the module board, and a second switching IC connected to the antenna connection terminal, the second switching IC being different from the first switching IC, the second switching IC includes a second common terminal, a third selection terminal, and a fourth selection terminal, a first filter connected to the first selection terminal and having a first passband that passes RF signals provided by the first switching IC, the first filter disposed on the first principle surface of the module board, a second filter connected to the second selection terminal and having a second passband that passes RF signals provided by the first switching IC, the second filter disposed on the first principle surface of the module board, a third filter connected to the third selection terminal and having a third passband that passes RF signals provided by the second switching IC, the third filter disposed on the second principle surface of the module board, and a fourth filter connected to the fourth selection terminal and having a fourth passband that passes RF signals provided by the second switching IC, the fourth filter disposed on the second principle surface of the module board, wherein the plurality of external-connection terminals are disposed on the second principal surface, and at least one of the first switching IC or the second switching IC is disposed on the second principal surface, and a first transfer path that passes RF signals from the first switching IC to the first filter and the second filter is separated by the module board from a second transfer path that passes RF signals from the second switching IC to the third filter and the fourth filter so as to isolate RF signals in the first RF passband and the second RF passband from other RF signals in the third RF passband and the fourth RF passband.

4. The communication device according to claim 3, wherein the first pass band, the second pass band, the third pass band, and the fourth pass band are in an order of frequency from lowest to highest or from highest to lowest, and frequencies of the first pass band and the second pass band do not overlap frequencies of the third pass band and the fourth pass band.

* * * * *